US011875928B2

(12) United States Patent
Misaki et al.

(10) Patent No.: US 11,875,928 B2
(45) **Date of Patent: *Jan. 16, 2024**

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takashi Misaki, Yokkaichi (JP); Kohei Yoshikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 512 days.

This patent is subject to a terminal disclaimer.

(21) Appl. No.: 16/972,086

(22) PCT Filed: May 30, 2019

(86) PCT No.: PCT/JP2019/021641

§ 371 (c)(1),
(2) Date: Dec. 4, 2020

(87) PCT Pub. No.: WO2019/235369

PCT Pub. Date: Dec. 12, 2019

(65) Prior Publication Data

US 2021/0225577 A1 Jul. 22, 2021

(30) Foreign Application Priority Data

Jun. 5, 2018 (JP) ................................ 2018-108161

(51) Int. Cl.
*H01F 27/06* (2006.01)
*H01F 27/26* (2006.01)
(Continued)

(52) U.S. Cl.
CPC ............. *H01F 27/266* (2013.01); *H01F 1/12* (2013.01); *H01F 27/022* (2013.01); *H01F 27/06* (2013.01);
(Continued)

(58) Field of Classification Search
CPC ........ H01F 27/266; H01F 1/12; H01F 27/022; H01F 27/06; H01F 27/306; H01F 37/00; H01F 27/32; H01F 1/26; H01F 27/263
See application file for complete search history.

(56) References Cited

U.S. PATENT DOCUMENTS

2002/0014941 A1* 2/2002 Yoshioka .............. H01F 27/266 336/184
2012/0044033 A1 2/2012 Kawaguchi
(Continued)

FOREIGN PATENT DOCUMENTS

JP 2013-222813 A 10/2013
JP 2015-012145 A 1/2015

OTHER PUBLICATIONS

International Search Report, Application No. PCT/JP2019/021641, dated Jul. 9, 2019. ISA/Japan Patent Office.

*Primary Examiner* — Tuyen T Nguyen
(74) *Attorney, Agent, or Firm* — Honigman LLP

(57) ABSTRACT

A reactor includes a coil, a magnetic core, and a holding member holding an end face of the wound part in an axial direction and an outer core part of the magnetic core. The holding member is a frame-shaped body having a through hole into which an end portion of the inner core part is inserted. The outer core part has an inward surface opposing
(Continued)

the inner core part, an outward surface on an opposite side to the inward surface, and a plurality of peripheral surfaces joining between the inward surface and the outward surface. The reactor includes a core coupling member, coupling the outer core part and the inner core part, having a supporting piece supporting the outward surface of the outer core part, and an engaging leg piece having a distal end engaging a peripheral surface engaging part formed on a peripheral surface of the inner core part.

8 Claims, 6 Drawing Sheets

(51) Int. Cl.

*H01F 1/12* (2006.01)
*H01F 27/02* (2006.01)
*H01F 27/30* (2006.01)
*H01F 37/00* (2006.01)
*H01F 27/32* (2006.01)

(52) U.S. Cl.

CPC .......... *H01F 27/306* (2013.01); *H01F 37/00* (2013.01); *H01F 27/32* (2013.01)

(56) References Cited

U.S. PATENT DOCUMENTS

2013/0106556 A1* 5/2013 Suzuki .................. H01F 27/306 336/212
2013/0249666 A1* 9/2013 Suzuki ................ H01F 41/0206 29/605
2015/0130576 A1* 5/2015 Suzuki .................. H01F 27/022 29/605
2018/0190421 A1 7/2018 Yoshikawa et al.

* cited by examiner

REACTOR

CROSS-REFERENCE TO RELATED APPLICATIONS

This application is the U.S. national stage of PCT/JP2019/021641 filed on May 30, 2019, which claims priority of Japanese Patent Application No. JP 2018-108161 filed on Jun. 5, 2018, the contents of which are incorporated herein.

TECHNICAL FIELD

The present disclosure relates to a reactor.

BACKGROUND

For example, JP 2017-55096A discloses a reactor that is provided with a coil having a wound part formed by winding a winding wire and a magnetic core forming a closed magnetic circuit, and that is utilized as a constituent component of a converter of a hybrid car or the like. The magnetic core of this reactor can be divided into an inner core part disposed inside the wound part and an outer core part disposed outside the wound part. In JP 2017-55096A, the magnetic core is formed by coupling a core piece forming the outer core part to the inner core part formed by coupling a plurality of core pieces and a gap material.

In a reactor, gaps formed between the core pieces affect the characteristics of the reactor. Thus, in the case of interposing a gap material between the core pieces, it is important to adjust the interval between the core pieces to a predetermined length, and in the case of bringing the core pieces into contact with each other, it is important to adjust the state in which the core pieces come into contact. However, with conventional configurations including JP 2017-55096A, there is a problem that this adjustment is complex. For example, in the case of coupling the core pieces together with an adhesive or the like, the interval between the core pieces must be properly maintained using a jig or the like until the adhesive solidifies. Also, in the case of integrating the core pieces with a mold resin or a potting resin, the interval between the core pieces must be properly maintained with a supporting member or the like from forming of the resin until the resin solidifies.

In view of this, one object of the present disclosure is to provide a reactor that can be produced with high productivity using a simple procedure.

A reactor of the present disclosure includes a coil having a wound part and a magnetic core having an inner core part disposed inside the wound part and an outer core part disposed outside the wound part. The reactor further includes a holding member holding an end face of the wound part in an axial direction and the outer core part. The holding member is a frame-shaped body having a through hole into which an end portion of the inner core part in the axial direction is inserted. The outer core part has an inward surface opposing the inner core part, an outward surface on an opposite side to the inward surface, and a plurality of peripheral surfaces joining between the inward surface and the outward surface. The reactor further includes a core coupling member coupling the outer core part and the inner core part. The core coupling member has a supporting piece supporting the outward surface of the outer core part; and an engaging leg piece extending from the supporting piece and passing through the holding member. The engaging leg piece has a distal end engaging a peripheral surface engaging part formed on a peripheral surface of the inner core part.

Advantageous Effects of Disclosure

A reactor of the present disclosure can be produced with high productivity using a simple procedure.

DETAILED DESCRIPTION OF PREFERRED EMBODIMENTS

Figure 1:
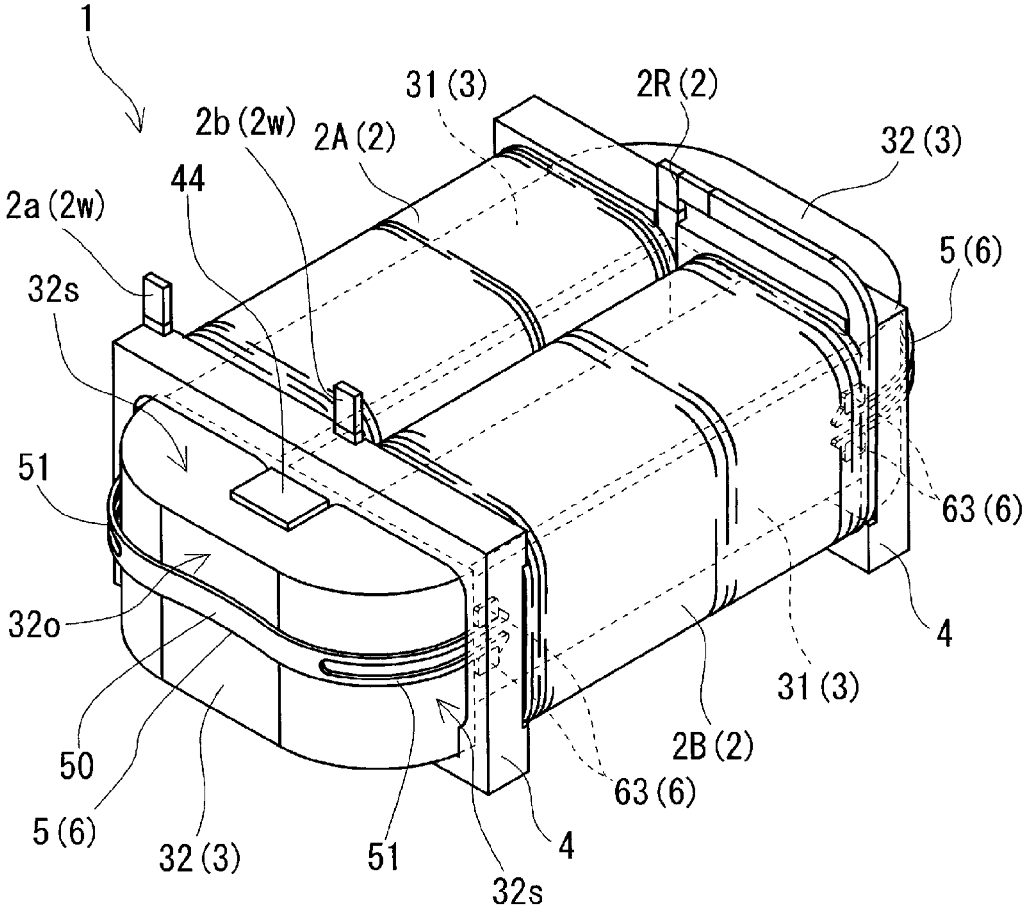
FIG. 1 is a perspective view of a reactor of a first embodiment.

Embodiments of the present disclosure will initially be enumerated and described.

1. A reactor according to an embodiment includes a coil having a wound part and a magnetic core having an inner core part disposed inside the wound part and an outer core part disposed outside the wound part. The reactor further includes a holding member holding an end face of the wound part in an axial direction and the outer core part. The holding member is a frame-shaped body having a through hole into which an end portion of the inner core part in the axial direction is inserted. The outer core part has an inward surface opposing the inner core part, an outward surface on an opposite side to the inward surface, and a plurality of peripheral surfaces joining between the inward surface and the outward surface. The reactor further includes a core coupling member coupling the outer core part and the inner core part. The core coupling member has a supporting piece supporting the outward surface of the outer core part; and an engaging leg piece extending from the supporting piece and passing through the holding member. The engaging leg piece has a distal end engaging a peripheral surface engaging part formed on a peripheral surface of the inner core part.

The core coupling member in the reactor of the present embodiment may be separate from the holding member and the outer core part or may be integrated therewith. In a reactor in which the core coupling member is independent from the holding member and the outer core part, the inner core part and the outer core part can be coupled simply by assembling together the inner core part and the outer core part with the holding member sandwiched therebetween, and attaching the core coupling member from the outward surface of the outer core part and engaging the distal end of the core coupling member with the inner core part. Also, in a reactor in which the outer core part, the holding member and the core coupling member are an integrated assembly, the inner core part and the outer core part can be coupled simply by engaging the distal end of the core coupling member of the assembly with the inner core part. In this way, the inner core part and the outer core part can be relatively positioned simply through mechanically engagement that uses the core coupling member, thus enabling the reactor of the embodiment to be produced with high productivity using a simple procedure. Naturally, the reactor of the embodiment may be molded with a resin after positioning the inner core part and the outer core part, or may be embedded in a case with a potting resin.

As one mode of the reactor according to the embodiment, the pressing piece can have a band shape applying pressure to the outward surface and pressing the outer core part against the holding member, and have a portion curved so as to protrude on the outward surface side.

By curving at least a portion of the supporting piece of the core coupling member so as to protrude toward the outward surface side of the outer core part, the supporting piece functions as a leaf spring. As a result, the pressing force applied to the outer core part by the core coupling member can be increased.

As one mode of the reactor according to the embodiment, the supporting piece can have a band shape applying pressure to the outward surface and pressing the outer core part against the holding member, and the engaging leg piece can extend from one end and another end of the supporting piece in an extending direction, and have a shape following a shape of the peripheral surface of the outer core part.

By forming the engaging leg piece to have a shape following the peripheral surface of the outer core part, a large gap tends not to occur between the peripheral surface of the outer core part and the engaging leg piece. As a result, the core coupling member can be inhibited from being damaged due to an object or a finger catching on the engaging leg piece when handling the reactor. In particular, in the case where the core coupling member is separate from the holding member, the core coupling member can be inhibited from falling off.

As one mode of the reactor according to the embodiment, the outer core part and the inner core part can each be an integrated part having an undivided structure.

Because the number of components constituting the magnetic core decreases if the outer core part and the inner core part are both integrated parts having an undivided structure, the man-hours involved in assembling the reactor can be reduced. Thus, the productivity of the reactor can be improved.

As one mode of the reactor described above, the peripheral surface engaging part can be a raised portion protruding outwardly of the inner core part.

By constituting the peripheral surface engaging part as a raised part, the peripheral surface engaging part can be formed without reducing the magnetic circuit cross-sectional area of the inner core part.

As one mode of the reactor described above, the peripheral surface engaging part can be a recessed portion recessed inwardly of the inner core part.

The inner core part is, for example, constituted by a molded body of a composite material including a soft magnetic powder and a resin, or a compacted powder molded body formed by compression molding a soft magnetic powder. With these molded bodies produced using a mold, forming a peripheral surface engaging part constituted by a recessed portion is easier than forming a peripheral surface engaging part constituted by a raised part. This is because the recessed portion can be formed using the mold for producing the inner core part, and can also be formed by machining after forming the inner core part.

As one mode of the reactor of the above, the end face of the inner core part in the axial direction can abut the inward surface of the outer core part.

When the inner core part and the outer core part are separated, magnetic flux tends to leak from between the separated core parts. In contrast, if the inner core part abuts the outer core part, as shown in the above configuration, leaking of magnetic flux from the boundary position between the inner core part and the outer core part can be inhibited, thus enabling a low loss reactor to be realized.

As one mode of the reactor according to the embodiment, at least the peripheral surface of the inner core part can be constituted by a molded body of a composite material including a soft magnetic powder and a resin.

A molded body of a composite material has greater flexibility in terms of shape than a compacted powder molded body formed by compression molding a soft magnetic powder. Thus, formation of the recessed portion or the raised part constituting the peripheral surface engaging part of the inner core part is facilitated.

Hereinafter, embodiments of a reactor of the present disclosure will be described based on the drawings. The same reference numerals in the drawings indicate elements of the same name. Note that the present disclosure is not limited to the configurations shown in the embodiments and is defined by the claims, and all changes that come within the meaning and range of equivalency of the claims are intended to be embraced therein.

First Embodiment

A first embodiment describes the configuration of a reactor 1 based on FIG. 1 to FIG. 4. The reactor 1 shown in FIG. 1 is constituted by assembling together a coil 2, a magnetic core 3, and a holding member 4. The magnetic core 3 is provided with an inner core part 31 and an outer core part 32. One of the features of this reactor 1 is having a configuration that mechanically couples the inner core part 31 and the outer core part 32 assembled together with the holding member 4 sandwiched therebetween. Hereinafter, each constituent element provided in the reactor 1 will be described.

Coil

The coil 2 of the present embodiment is provided with a pair of wound parts 2A and 2B and a coupling part 2R that couples the wound parts 2A and 2B together, as shown in FIG. 1. The wound parts 2A and 2B are each formed in a hollow tubular shape with the same number of turns and the same winding direction, and are aligned such that respective axial directions are parallel. In the present example, the coil 2 is manufactured by coupling the wound parts 2A and 2B produced using separate winding wires 2*w*, but the coil 2 can also be manufactured with a single winding wire 2*w*.

The wound parts 2A and 2B of the present embodiment are formed in a square-tubular shape. The square-tubular wound parts 2A and 2B are wound parts whose end face shape is a four-cornered shape (including a square shape) with rounded corners. Naturally, the wound parts 2A and 2B may be cylindrically formed. Cylindrical wound parts are wound parts whose end face shape is a closed curved shape (an elliptical shape, a perfectly round shape, a racetrack shape, etc.).

The coil 2 including the wound parts 2A and 2B can be constituted by a covered wire provided with an insulated covering made from an insulating material on an outer periphery of a conductor such as a flat wire or a round wire made from a conductive material such as copper, aluminum and magnesium or an alloy thereof. In the present embodiment, the wound parts 2A and 2B are formed by edgewise winding a covered flat wire (winding wire 2*w*) whose conductor is made from a copper flat wire and whose insulated covering is made from an enamel (typically, polyamide imide).

Both end portions 2*a* and 2*b* of the coil 2 extend from the wound parts 2A and 2B, and are connected to a terminal member which is not illustrated. At both end portions 2*a* and 2*b*, the insulated covering of an enamel or the like has been removed. Connection of an external device such as a power source that performs power supply to the coil 2 is established via this terminal member.

Magnetic Core

The magnetic core 3 is provided with inner core parts 31 and 31 respectively disposed inside the wound part 2A and the wound part 2B, and outer core parts 32 and 32 forming a closed magnetic circuit with these inner core parts 31 and 31.

Inner Core Part

The inner core part 31 is a portion of the magnetic core 3 that extends in the axial direction of the wound parts 2A and 2B of the coil 2. In the present example, both end portions of the portion of the magnetic core 3 that extends in the axial direction of the wound parts 2A and 2B protrude from the end faces of the wound parts 2A and 2B. These protruding portions are also a portion of the inner core part 31. The end portions of the inner core part 31 that protrude from the wound parts 2A and 2B are inserted into a through hole 40 (FIG. 2) of the holding member 4 which will be described later.

Figure 2:
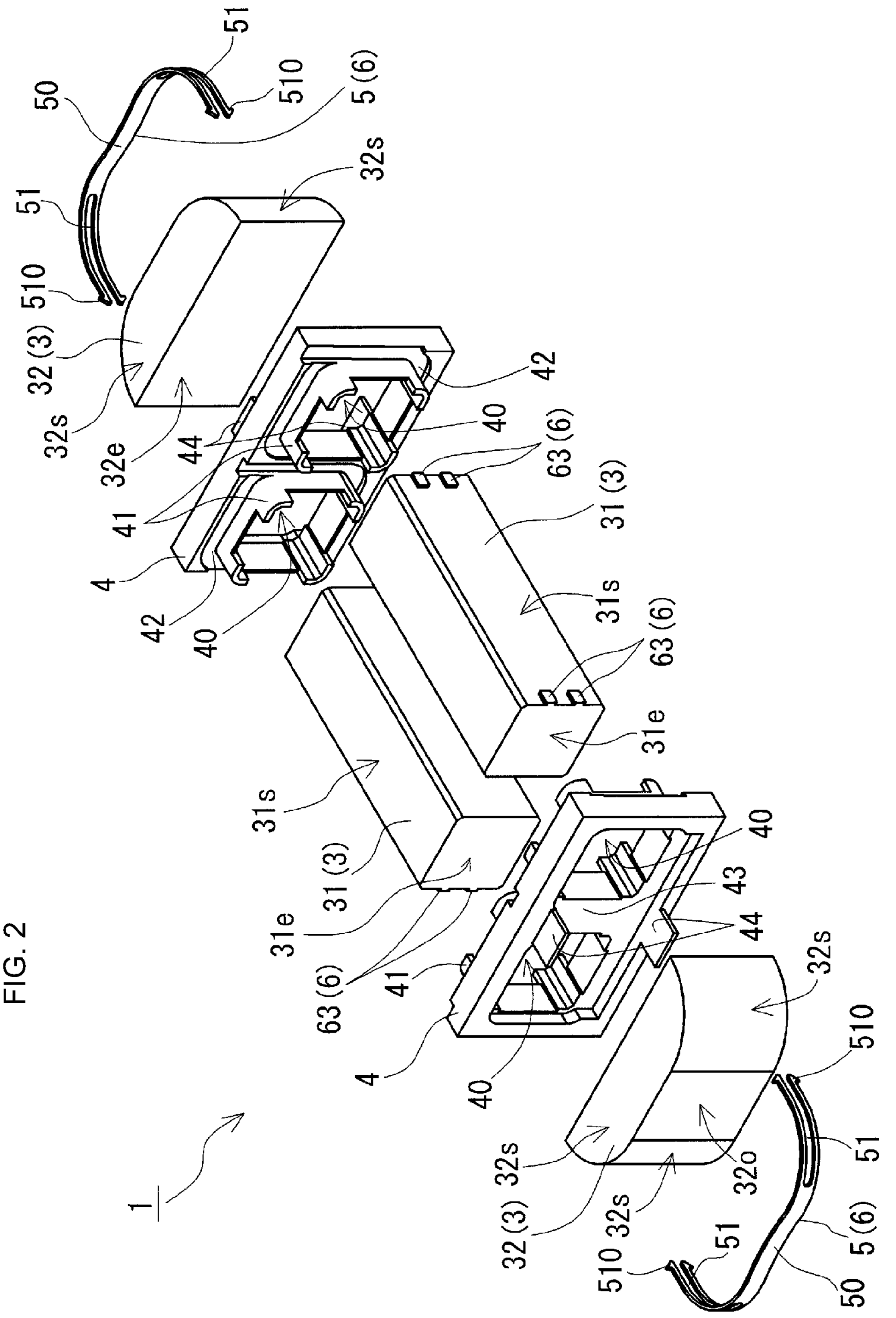
FIG. 2 is an exploded perspective view of the reactor of FIG. 1 excluding a coil.

The shape of the inner core part 31 is not particularly limited as long as the shape follows the internal shape of the wound part 2A (2B). The inner core part 31 of the present example is an approximately rectangular parallelepiped as shown in FIG. 2. The inner core part 31 is an integrated part having an undivided structure, this being one of the factors facilitating assembly of the reactor 1. Alternatively to the present example, the inner core part 31 can also be constituted by assembling together a plurality of divided pieces. A gap plate made with alumina or the like can be interposed between the divided pieces.

An end face 31*e* of the inner core part 31 in the axial direction abuts an inward surface 32*e* of the outer core part 32 which will be described later. An adhesive may be interposed between the end face 31*e* and the inward surface 32*e*, but is not necessary. As will be described later, this is because the inner core part 31 and the outer core part 32 are mechanically fixed, and the respective positions thereof are set.

The inner core part 31 of the present example is, furthermore, provided with a peripheral surface engaging part 63 that is formed on a peripheral surface 31*s* thereof. The peripheral surface engaging part 63 of the present example is a raised portion formed by a portion of the inner core part 31 protruding outwardly, and constitutes a portion of a coupling part 6 that couples the inner core part 31 and the outer core part 32. The coupling part 6 will be described under a new heading.

Outer Core Part

The outer core part 32 is a portion of the magnetic core 3 that is disposed outside the wound parts 2A and 2B (FIG. 1). The shape of the outer core part 32 is not particularly limited as long as the shape joins the end portions of the pair of inner core parts 31 and 31. The outer core part 32 of the present example is a block body whose upper surface and lower surface are approximately dome-shaped. This outer core part 32 is an integrated part having an undivided structure, this being one of the factors facilitating assembly of the reactor 1.

Each outer core part 32 has the inward surface 32*e* (see outer core part 32 on the right side of the page) opposing the end faces of the wound parts 2A and 2B of the coil 2, an outward surface 32*o* (see outer core part 32 on the left side of the page) on the opposite side to the inward surface 32*e*, and a peripheral surface 32*s*. The inward surface 32*e* and the outward surface 32*o* are flat surfaces parallel to each other. An upper surface and a lower surface of the peripheral surface 32*s* are flat surfaces that are parallel to each other and orthogonal to the inward surface 32*e* and the outward surface 32*o*. Also, two side surfaces of the peripheral surface 32*s* are curve surfaces.

Materials, Etc.

The inner core part 31 and the outer core part 32 can be constituted by a compacted powder molded body formed by compression molding a base powder including a soft magnetic powder, or a molded body made from a composite material of a soft magnetic powder and a resin. In addition, both core parts 31 and 32 can also be constituted as a hybrid core in which the outer periphery of a compacted powder molded body is covered with a composite material.

The compacted powder molded body can be produced by filling a mold with a base powder and applying pressure thereto. Due to this production method, the content of soft magnetic powder in the compacted powder molded body can be readily increased. For example, the content of soft magnetic powder in the compacted powder molded body can be increased to over 80 volume %, and, furthermore, to 85 volume % or more. Thus, in the case of a compacted powder molded body, core parts 31 and 32 whose saturation magnetic flux density and relative permeability are high are readily obtained. For example, the relative permeability ratio of the compacted powder molded body can be set to from 50 to 500 inclusive, and, furthermore, from 200 to 500 inclusive.

The soft magnetic powder of the compacted powder molded body is an aggregate of soft magnetic particles that are constituted by an iron group metal such as iron, an alloy thereof (Fe—Si alloy, Fe—Ni alloy, etc.), or the like. An insulated covering that is constituted by a phosphate or the like may be formed on the surface of the soft magnetic particles. Also, the base powder may contain a lubricant or the like.

On the other hand, the molded body of a composite material can be produced by filling a mold with a mixture of a soft magnetic powder and an uncured resin, and solidifying the resin. Due to this production method, the content of the soft magnetic powder in the composite material can be readily adjusted. For example, the content of the soft magnetic powder in the composite material can set to from 30 volume % to 80 volume % inclusive. From the viewpoint of improving saturation magnetic flux density and heat dissipation, the content of the magnetic powder is, furthermore, preferably 50 volume % or more, 60 volume % or more, and 70 volume % or more. Also, from the viewpoint of improving fluidity of the composite material in the manufacturing process, the content of the magnetic powder is preferably set to 75 volume % or less. With the molded body of a composite material, the relative permeability thereof is readily reduced by adjusting the filling rate of the soft magnetic powder to a lower rate. For example, the relative permeability of the molded body of a composite material can be set to from 5 to 50 inclusive, and, furthermore, from 20 to 50 inclusive.

The same material that can be used with the compacted powder molded body can be used for the soft magnetic powder of the composite material. On the other hand, a thermosetting resin, a thermoplastic resin, a room-temperature curing resin and a cold curing resin are given as examples of the resin contained in the composite material. An unsaturated polyester resin, an epoxy resin, a urethane resin and a silicone resin are given as examples of the thermosetting resin. A polyphenylene sulphide (PPS) resin, a polytetrafluoroethylene (PTFE) resin, a liquid crystal polymer (LCP), a polyamide (PA) resin such as nylon 6 or nylon 66, a polybutylene terephthalate (PBT) resin and an acrylonitrile butadiene styrene (ABS) resin are given as examples of the thermoplastic resin. In addition, a millable silicone rubber, a millable urethane rubber, a BMC (Bulk molding compound) in which calcium carbonate or glass fiber is mixed with an unsaturated polyester and the like can also be utilized. Heat dissipation is further improved when the abovementioned composite material contains a nonmagnetic and nonmetallic powder (filler) such as alumina or silica, in addition to the soft magnetic powder and the resin. The content of the nonmagnetic and nonmetallic powder may be from 0.2 mass % to 20 mass % inclusive, and, furthermore, from 0.3 mass % to 15 mass % inclusive, and from 0.5 mass % to 10 mass % inclusive.

Here, in order to form the peripheral surface engaging part 63 on the peripheral surface 31*s* of the inner core part 31, it is preferable that at least the peripheral surface 31*s* is formed with a molded body of a composite material. This is because a molded body of a composite material has greater flexibility in terms of shape than a compacted powder molded body which has restrictions on the direction in which pressure is applied at the time of molding, and thus formation of the peripheral surface engaging part 63 is facilitated. In the case of constituting the inner core part 31 as a hybrid core, the compacted powder molded body need only be disposed in a mold and a composite material injected into the mold.

Holding Member

The holding member 4 shown in FIG. 2 is a member that is interposed between the end faces of the wound parts 2A and 2B (FIG. 1) of the coil 2 and the inward surface 32*e* of the outer core part 32 of the magnetic core 3, and holds the end faces of the wound parts 2A and 2B in the axial direction and the outer core part 32. The holding member 4, typically, is constituted by an insulating material, and functions as an insulating member between the coil 2 and the magnetic core 3 and a positioning member of the inner core part 31 and the outer core part 32 with respect to the wound parts 2A and 2B. The two holding members 4 of the present example have the same shape. In this case, since the mold for producing the holding member 4 can be commonly used, excellent productivity of the holding member 4 is achieved.

The holding member 4 is provided with a pair of through holes 40 and 40, a plurality of core supporting parts 41, a pair of coil housing parts 42 (see member 4 on the right side of the page), one core housing part 43 (see member 4 on the left side of the page), and a pair of restraining parts 44. The through hole 40 passes through the holding member 4 in the thickness direction, and the end portion of the inner core part 31 is inserted into this through hole 40. The core supporting part 41 is an arc-shaped piece that partially protrudes from the inner peripheral surface of each through hole 40, and supports a corner portion of the inner core part 31. The coil housing part 42 is a recess that follows the end faces of the wound parts 2A and 2B (FIG. 1), and the end faces and a vicinity thereof are fitted therein. The core housing part 43 is formed by a portion of the surface of the holding member 4 on the outer core part 32 side being recessed in the thickness direction, and the inward surface 32*e* of the outer core part 32 and a vicinity thereof are fitted therein (see also FIG. 1). The end face 31*e* of the inner core part 31 fitted in the through hole 40 of the holding member 4 is substantially flush with the bottom surface of the core housing part 43. Thus, the end face 31*e* of the inner core part 31 abuts the inward surface 32*e* of the outer core part 32. An upward restraining part 44 and a downward restraining part 44 are provided at intermediate positions of the holding member 4 in the width direction, and respectively restrain the upper surface and the lower surface of the outer core part 32 fitted in the core housing part 43.

Here, the four corners (portion integrated with the core supporting part 41) of the through hole 40 in the present example have a shape substantially following the corner portions of the end face 31*e* of the inner core part 31, and the inner core part 31 is supported within the through hole 40 by these four corners. The upper edge portion, lower edge portion and both side edge portions of this through hole 40 excluding the four corners outwardly extend beyond the outline of the end face 31*e* of the inner core part 31. In other words, if the inner core part 31 is fitted in the through hole 40, a gap passing through the holding member 4 is formed in the position of the portions that extend therebeyond (extended portions). On the other hand, the core housing part 43 is a shallow recess provided with the bottom surface including the abovementioned through hole 40. When the outer core part 32 is fitted in the core housing part 43, the inward surface 32*e* of the outer core part 32 fitted in the core housing part 43 abuts and is supported by an inverted T-shaped surface that is constituted by a portion sandwiched by the pair of through holes 40 and a portion on the downward side with respect to the through holes 40, which are portions of the bottom surface of the core housing part 43. This core housing part 43, as shown in the schematic front view in FIG. 3, has a shape substantially following the outline of the outer core part 32, when looking in front view from the outward surface 32*o* side of the outer core part 32, but the portion on the upward side of the upper edge portion and the side edge portions of the core housing part 43 extends on the outward side of the outline. Because the portion other than the portion extending outwardly follow the outline of the outer core part 32, movement of the outer core part 32 fitted in the core housing part 43 in the left-right direction (alignment direction of the through holes 40) is regulated.

Figure 3:
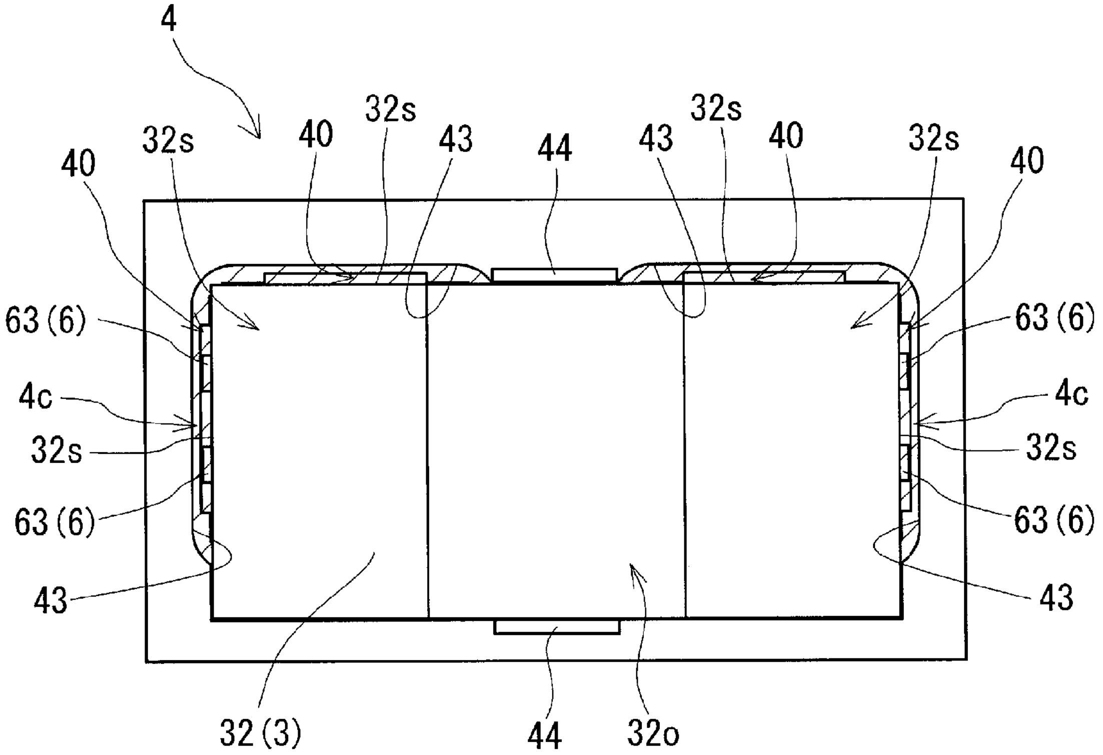
FIG. 3 is a schematic front view looking at an assembly of an outer core part, an inner core part and a holding member in the reactor of the first embodiment from an outer core part side.

As shown in FIG. 3, when the outer core part 32 is fitted in the core housing part 43, a gap is formed between the inner wall surface (portion shown with indicator line of reference numeral) of the core housing part 43 and the peripheral surface 32*s* of the outer core part 32. In FIG. 3, this gap (separation part 4*c*) is shown with the 45-degree hatching. The gap between the extended part of the through hole 40 and the peripheral surface 31*s* of the inner core part 31 (FIG. 2) communicates through the inside of the separation part 4*c*. Thus, the peripheral surface engaging part 63 formed on the peripheral surface 31*s* of the inner core part 31 (FIG. 2) is visible from the outer side of the holding member 4. The separation part 4*c* in which the circumferential side engaging part 63 can be seen functions as an insertion hole for inserting the engaging leg piece 51 of the core connection component 5 (FIG. 2) which will be described later. Here, in the case of molding the reactor 1 with a resin or the like, the separation part 4*c* on the upward side functions as a resin filling hole that guides the resin between the inner peripheral surface of the wound parts 2A and 2B and the peripheral surface 31*s* of the inner core part 31.

The holding member 4 can, for example, be constituted by a thermoplastic resin such as a polyphenylene sulphide (PPS) resin, a polytetrafluoroethylene (PTFE) resin, a liquid crystal polymer (LCP), a polyamide (PA) resin such as nylon 6 or nylon 66, a polybutylene terephthalate (PBT) resin, or an acrylonitrile butadiene styrene (ABS) resin. In addition, the holding member 4 can be formed with a thermosetting resin such as an unsaturated polyester resin, an epoxy resin, a urethane resin or a silicone resin. Heat dissipation of the holding member 4 may be improved by including a ceramic filler in these resins. A nonmagnetic powder such as alumina or silica, for example, can be utilized as the ceramic filler.

Coupling Part

Figure 4:
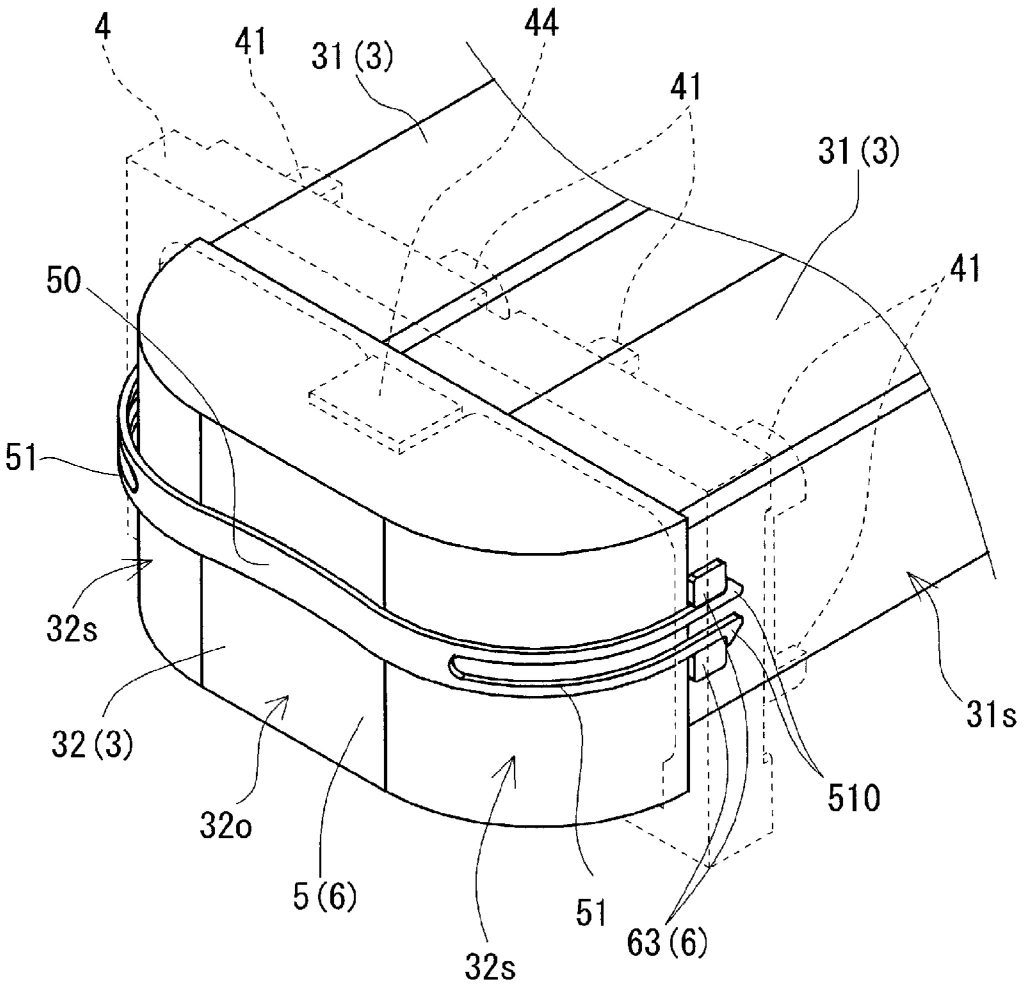
FIG. 4 is a partial enlarged perspective view illustrating a coupling part exemplified in the first embodiment.

The reactor 1 of the present example is provided with a coupling part 6 that mechanically couples the inner core part 31 and the outer core part 32, as shown in FIGS. 1, 2 and 4. The coupling part 6 is constituted by a peripheral surface engaging part 63 that is formed on the peripheral surface 31*s* of the inner core part 31 and a coupling member 5 that holds the outer core part 32 from the outward surface 32*o* side thereof.

Peripheral Surface Engaging Part

The peripheral surface engaging part 63 of the present example is provided on a side surface of the peripheral surface 31*s* of each inner core part 31 in the alignment direction of the pair of wound parts 2A and 2B (FIG. 1). More specifically, the peripheral surface engaging part 63 that is provided on each inner core part 31 is constituted by a pair of raised portions that are separated in the height direction (direction orthogonal to both the alignment direction and the axial direction of the wound parts 2A and 2B) of the reactor 1. The raised portions protrude outwardly of the inner core part 31, that is, on the outer side the inner core part 31 in the alignment direction of the wound parts 2A and 2B. Also, the end face of the raised portions in the axial direction of the inner core part 31 is flush with the end face 31*e* of the inner core part 31 (FIG. 2).

The shape of the peripheral surface engaging part 63 (raised portion) is not particularly limited as long as the shape enables the distal end of a core coupling member 5 which will be described later to be engaged. The shape of the raised portion in the present example is rectangular in front view looking from the protruding direction of the raised portion. Also, the protruding height of the peripheral surface engaging part 63 (raised portion) is set to a height at which the engaging strength with the core coupling member 5 can be secured and the raised portion is not susceptible to damage. For example, the protruding height of the raised portion is preferably set to from 0.2 mm to 5 mm inclusive, and more preferably from 0.5 mm to 1 mm inclusive. The range of the height of the raised portion corresponding to the recessed portion is also preferably set in the same range as the preferable depth of the recessed portion.

The peripheral surface engaging part 63 is preferably integrally formed with the inner core part 31 using the same material as the material constituting the inner core part 31. Filling a mold with a composite material and producing an inner core part 31 provided with the peripheral surface engaging part 63 is given as an example. By constituting the peripheral surface engaging part 63 with a raised portion, the peripheral surface engaging part 63 can be formed without decreasing the magnetic circuit cross-sectional area of the inner core part 31. Alternatively to the present example, the peripheral surface engaging part 63 can also be formed, by a small piece constituted by a different material from the material constituting the inner core part 31 being embedded in the inner core part 31.

Core Coupling Member

The core coupling member 5 will be described particularly with reference to FIG. 4. The core coupling member 5 of the present example presses the outer core part 32 against the holding member 4, and mechanically engages the above-mentioned peripheral surface engaging part 63 to couple the outer core part 32 and the inner core part 31. The core coupling member 5 has a supporting piece 50 that presses on the outward surface 32*o* of the outer core part 32 and a pair of engaging leg pieces 51. The supporting piece 50 is formed in a band shape, and curves so as to be raised toward the outward surface 32*o*. The supporting piece 50 curves to a greater degree after attachment to the outer core part 32 than before attachment. In other words, when the core coupling member 5 is disposed on the outer core part 32, the supporting piece 50 functions as a leaf spring by deforming into a shape that substantially follows the outward surface 32*o* of the outer core part 32 and applies a pressing force to the outward surface 32*o*. In the present example, the whole of the supporting piece 50 is curved, but a portion of the supporting piece 50 may be curved. In this way, by curving at least a portion of the supporting piece 50 so as to protrude on the outward surface 32*o* side, the supporting piece 50 functions as a leaf spring. As a result, the pressing force exerted on the outer core part 32 by the core coupling member 5 can be increased.

The engaging leg pieces 51 of the core coupling member 5 respectively extend from one end and the other end of the supporting piece 50 in the extending direction. The engaging leg piece 51 of the present example has a forked configuration that curves following the shape of the peripheral surface 32*s* (curved side surface) of the outer core part 32, and is provided with a pair of branch legs on the distal end side thereof. By forming the engaging leg piece 51 to have a shape following the peripheral surface 32*s* of the outer core part 32, a large gap tends not to occur between the peripheral surface 32*s* and the engaging leg piece 51. As a result, the core coupling member 5 can be inhibited from being knocked off due to an object or a finger catching on the engaging leg piece 51 when handing the reactor 1. Note that the branch legs of the present example occupy approximately 70 percent of the length of the engaging leg piece 51, but may be shorter or longer.

A claw-shaped holding-side engaging part 510 (hereinafter, referred to as claw portion 510 only in the first embodiment) is formed at the distal end of each branch leg of the engaging leg piece 51. The claw portion 510 is formed by the distal ends of the respective branch legs being bent in a direction away from each other (one way and the other way in the height direction of the reactor 1). The total width (length in the height direction of the reactor 1) of both branch legs is smaller than the separation distance between the two raised portions forming the peripheral surface engaging part 63. The total maximum width of the claw portions 510 of both branch legs is also smaller than the separation distance between the two raised portions. Thus, if the distal end of the engaging leg piece 51 is inserted from the separation part 4*c* of the side edge in FIG. 3 and pushed between the two raised portions, the interval between the two claw portions 510 narrows. The core coupling member 5 engages and is fixed to the inner core part 31 due to the interval between both claw portions 510 widening and the stepped portion of the claw portion 510 catching on the raised portions (peripheral surface engaging part 63) when the outer end portions of the claw portions 510 exceed the position of the raised portions. At that time, the supporting piece 50 of the core engaging member 5 presses on the outward surface 32*o* of the outer core part 32 and the outer core part 32 is pressed against the holding member 4. Due to this pressing, the inward surface 32*e* of the outer core part 32 contacts the end face 31*e* of the inner core part 31.

Use Mode

The reactor 1 of the present example can be utilized as a constituent member of a power conversion device such as a bidirectional DC-DC converter mounted in an electrically powered vehicle such as a hybrid car, an electric car or a fuel cell vehicle. The reactor 1 of the present example can be used in a state of being immersed in a liquid refrigerant. The liquid refrigerant is not particularly limited, and ATF (Automatic Transmission Fluid) or the like can be utilized as the liquid refrigerant, in the case of utilizing the reactor 1 with a hybrid car. In addition, a fluorinated inert liquid such as Fluorinert (registered trademark), a fluorocarbon refrigerant such as HCFC-123 or HFC-134a, an alcohol refrigerant such as methanol or alcohol, a ketone refrigerant such as acetone or the like can also be utilized as the liquid refrigerant. In the reactor 1 of the present example, since the wound parts 2A and 2B are externally exposed, the wound parts 2A and 2B are brought in direct contact with the cooling medium in the case of cooling the reactor 1 with a cooling medium such as a liquid refrigerant, and thus the reactor 1 of the present example exhibits excellent heat dissipation.

Effects

In the reactor 1 of the present example, the inner core part 31 and the outer core part 32 can be coupled, simply by assembling together the inner core part 31 and the outer core part 32 with the holding member sandwiched therebetween 4, and attaching the core coupling member 5 from the outward surface 32*o* of the outer core part 32 and engaging the distal end of the core coupling member 5 with the inner core part 31. In this way, the inner core part 31 and the outer core part 32 can be relatively positioned simply through mechanically engagement that uses the core coupling member 5, thus enabling the reactor 1 of the present example to be produced with high productivity using a simple procedure. Naturally, the reactor 1 of the resent embodiment may be molded with a resin after positioning the inner core part 31 and the outer core part 32, or may be embedded in a case with a potting resin.

Second Embodiment

A reactor whose configuration of the coupling part 6 differs from the first embodiment will be described based on FIG. 5.

Figure 5:
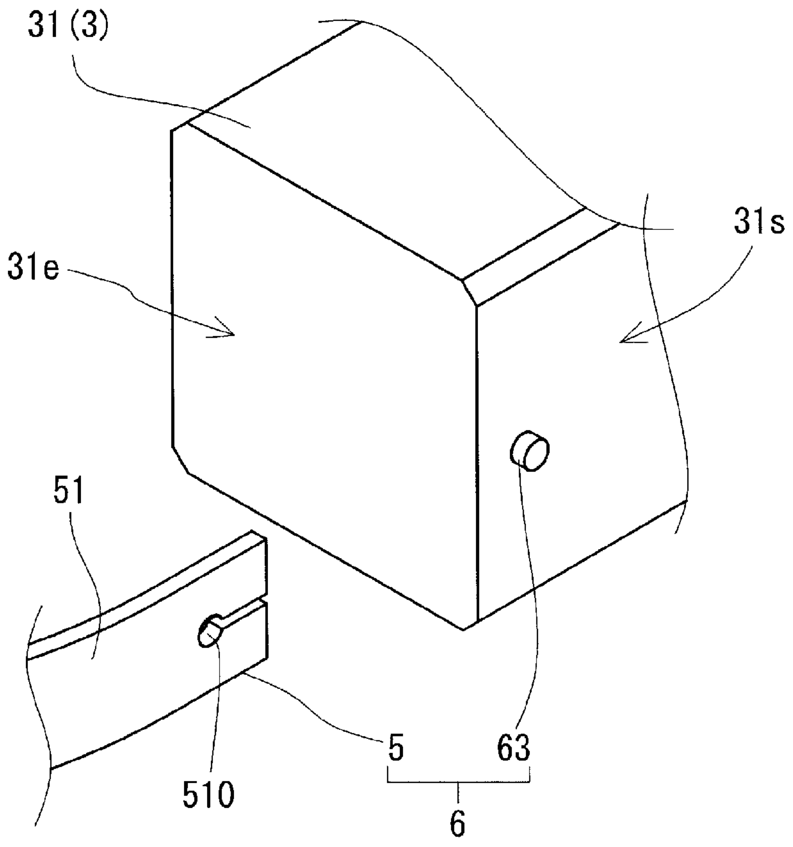
FIG. 5 is a partial enlarged perspective view illustrating a coupling part exemplified in a second embodiment.

FIG. 5 is a diagram illustrating only a vicinity of the holding-side engaging part 510 in the core coupling member 5 and a vicinity of the inner core part 31 of the end face 31*e*. The configuration other than the illustrated configuration is similar to the first embodiment, and description thereof will be omitted. This also similarly applies to FIG. 6 which will be described later.

The peripheral surface engaging part 63 of the present example is constituted by a cylindrical raised portion that protrudes from the peripheral surface 31*s* of the inner core part 31. On the other hand, the holding-side engaging part 510 of this example, is configured by a slit that is cut inwardly from the end face of the engaging leg piece 51 and a fastening hole that is formed in an innermost portion of the slit and passes through the engaging leg piece 51 in the thickness direction. The width of the slit is slightly smaller than the outer diameter of the cylindrical peripheral surface engaging part 63, and the inner diameter of the fastening hole is slightly larger than the outer diameter of the cylindrical peripheral surface engaging part 63. Thus, if the engaging leg piece 51 is pushed toward the peripheral surface engaging part 63, the slit is pushed apart by the peripheral surface engaging part 63, and the core coupling member 5 is fixed to the inner core part 31 due to the peripheral surface engaging part 63 fitting in the fastening hole.

As a variation of the second embodiment, a flange may be provided at the distal end of the cylindrical peripheral surface engaging part 63. This enables the holding-side engaging part 510 to be effectively prevented from disengaging from the peripheral surface engaging part 63.

Third Embodiment

Figure 6:
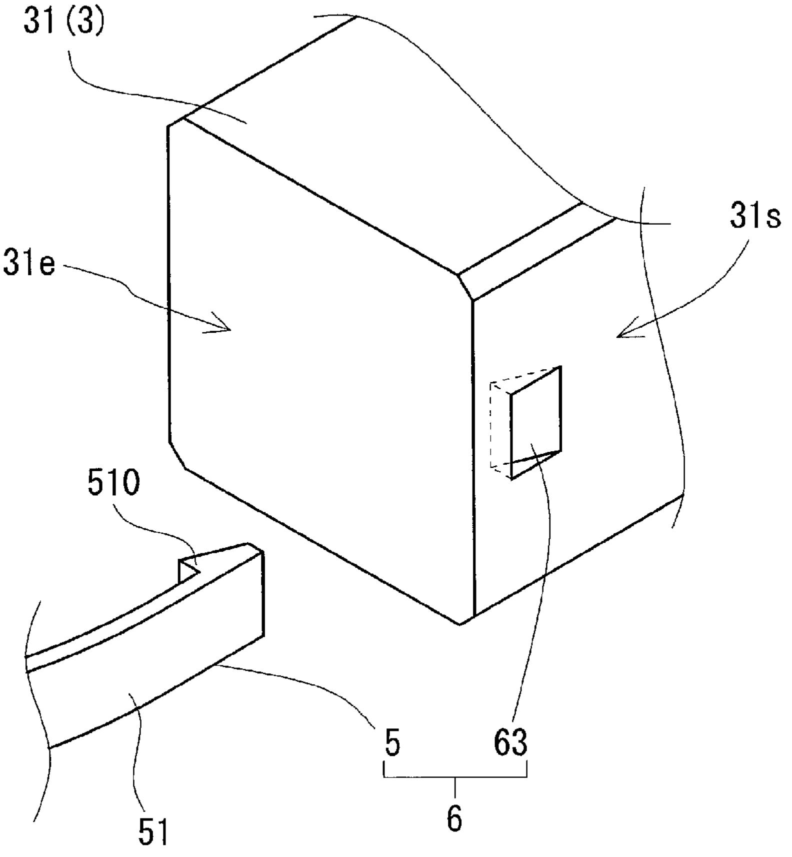
FIG. 6 is a partial enlarged perspective view illustrating a coupling part exemplified in a third embodiment.

In a third embodiment, a reactor whose configuration of the coupling part 6 differs from the first and second embodiments will be described based on FIG. 6.

The peripheral surface engaging part 63 of the present example is a recessed portion formed by a portion of the peripheral surface 31*s* of the inner core part 31 being recessed inwardly of the inner core part 31. This recessed portion is deep on the end face 31*e* side and is shallow on the opposite side to the end face 31*e*. On the other hand, the holding-side engaging part 510 is a claw portion that budges toward the peripheral surface 31*s* of the inner core part 31. The shape of the claw portion (holding-side engaging part 510) is a shape following the inner peripheral surface shape of the recessed portion (peripheral surface engaging part 63). Thus, if the claw portion is engaged with the recessed portion, the stepped portion of the claw portion catches in the step of the recessed portion, and the core coupling member 5 is firmly fixed to the inner core part 31.

The peripheral surface engaging part 63 of the present example can be formed on the peripheral surface 31*s* of the inner core part 31 at the same time as production of the inner core part 31 using the mold for producing the inner core part 31. Alternatively to the present example, after molding the inner core part 31, the peripheral surface engaging part 63 can also be formed by machining the peripheral surface 31*s* of the inner core part 31.

Fourth Embodiment 4

In the first to third embodiments, the core coupling member 5 was independent of both the holding member 4 and the outer core part 32. In contrast, the reactor 1 can also be constituted using an assembly in which the holding member 4, the outer core part 32 and the core coupling member 5 are integrated.

According to the configuration of the present example, the reactor 1 can be finished simply by disposing the wound parts 2A and 2B on the outer periphery of the inner core parts 31, and engaging the holding-side engaging parts 510 of the assembly with the peripheral surface engaging parts 63 of the inner core part 31.

Here, the assembly can be produced by disposing the outer core part 32 in a mold and performing resin molding. In this case, the holding member 4 and the core coupling member 5 are integrally resin molded on the outer periphery of the outer core part 32. In addition, the assembly may be produced by disposing a core coupling member 5 produced in advance in a mold in the state of being assembled together with the outer core part 32, and performing resin molding.

In this case, the core coupling member 5 is integrated with the outer core part 32 by the resin-molded holding member 4.

The invention claimed is:

1. A reactor comprising:

a coil having a wound part;

a magnetic core having an inner core part disposed inside the wound part and an outer core part disposed outside the wound part; and a holding member holding an end face of the wound part in an axial direction and the outer core part, wherein the holding member is a frame-shaped body having a through hole into which an end portion of the inner core part in the axial direction is inserted, and the outer core part has an inward surface opposing the inner core part, an outward surface on an opposite side to the inward surface, and a plurality of peripheral surfaces joining between the inward surface and the outward surface, the reactor comprising a core coupling member coupling the outer core part and the inner core part, wherein the core coupling member has:

a supporting piece supporting the outward surface of the outer core part; and an engaging leg piece extending from the supporting piece and passing through the holding member, and the engaging leg piece has a distal end engaging a peripheral surface engaging part formed on a peripheral surface of the inner core part.

2. The reactor according to claim 1, wherein the pressing piece has a band shape applying pressure to the outward surface and pressing the outer core part against the holding member, and has a portion curved so as to protrude on the outward surface side.

3. The reactor according to claim 1, wherein the supporting piece has a band shape applying pressure to the outward surface and pressing the outer core part against the holding member, and the engaging leg piece extends from one end and another end of the supporting piece in an extending direction, and has a shape following a shape of the peripheral surface of the outer core part.

4. The reactor according to claim 1, wherein the outer core part and the inner core part are each an integrated part having an undivided structure.

5. The reactor according to claim 1, wherein the peripheral surface engaging part is a raised portion protruding outwardly of the inner core part.

6. The reactor according to claim 1, wherein the peripheral surface engaging part is a recessed portion recessed inwardly of the inner core part.

7. The reactor according to claim 1, wherein the end face of the inner core part in the axial direction abuts the inward surface of the outer core part.

8. The reactor according to claim 1, wherein at least the peripheral surface of the inner core part is constituted by a molded body of a composite material including a soft magnetic powder and a resin.

* * * * *